(No Model.)
I. F. BISSELL.
NUT LOCK.
No. 470,973. Patented Mar. 15, 1892.
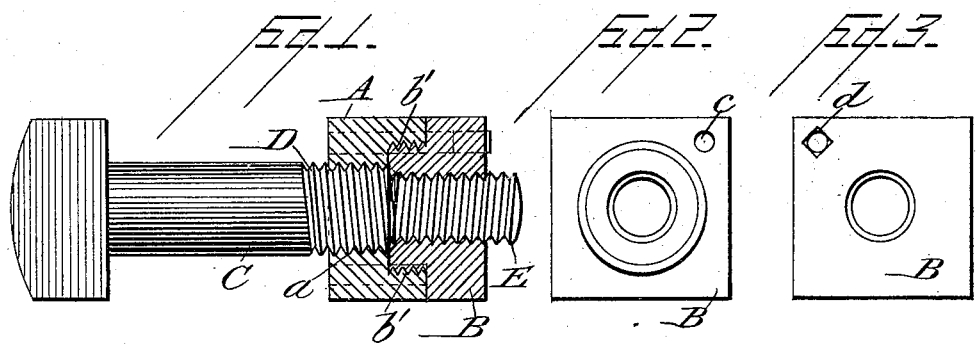
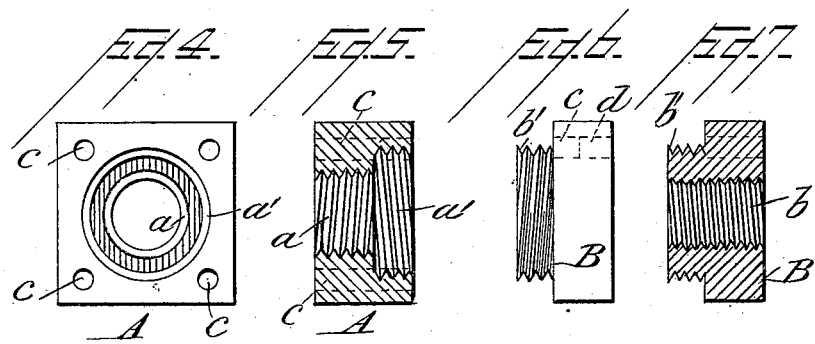
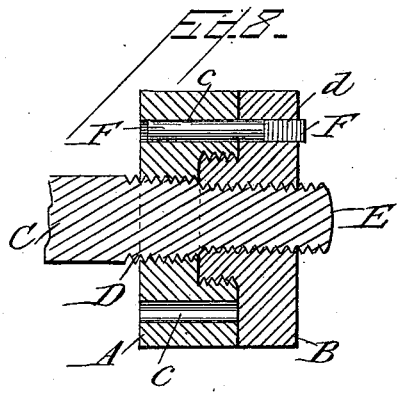
Attest:
H. H. Schott
Wm L. Boyden.
Inventor
Isaac F. Bissell
per John C. Tasker.
Atty

UNITED STATES PATENT OFFICE.

ISAAC F. BISSELL, OF TRENTON, NEW JERSEY.

NUT-LOCK.

SPECIFICATION forming part of Letters Patent No. 470,973, dated March 15, 1892.

Application filed September 25, 1890. Serial No. 366,116. (No model.)

*To all whom it may concern:*

Be it known that I, ISAAC F. BISSELL, a citizen of the United States, residing at Trenton, in the county of Mercer and State of New Jersey, have invented certain new and useful Improvements in Nut-Locks; and I do hereby declare the following to be a full, clear, and exact description of the invention, such as will enable others skilled in the art to which it appertains to make and use the same.

This invention relates to an improvement in nut-locks, the object of the invention being to simplify and perfect the construction of devices employed for this purpose; and it therefore consists in the construction, arrangement, and combination of parts, substantially as will be hereinafter described and claimed.

In the accompanying drawings, illustrating my invention, Figure 1 is a vertical longitudinal section of my improved lock-nut, represented as applied in operative position to a bolt which is provided with right and left hand threads. Fig. 2 is a plan view of the left-hand part of my improved lock-nut. Fig. 3 is a reverse plan view of the same. Fig. 4 is a plan view of the right-hand part of the lock-nut. Fig. 5 is a vertical section of the same. Fig. 6 is a side elevation of the left-hand part of the nut. Fig. 7 is a vertical section of the same. Fig. 8 is a vertical section of my improved lock-nut and the right and left hand threaded bolt with which it is applied, the section being taken upon a diagonal line of Figs. 1 and 2, so as to show the pin which is used for the purpose of holding the two nuts together so as to prevent turning.

Similar letters of reference designate corresponding parts throughout all the different figures of the drawings.

My improved lock-nut is designed for use with a bolt having right and left hand threads. This bolt may have its threads intertwining or it may have two sections of threads, one section being a right-hand thread and the other being a left-hand thread.

C denotes an example of bolt having the right-hand-threaded section D and the left-hand-threaded section E, these two sections being of different diameter, the right-hand part being the larger.

The nut-lock consists, essentially, of two nuts, one of which I term the "right-hand nut" and the other the "left-hand nut."

A denotes the right-hand nut, which is adapted to travel upon the right-hand-threaded section or the right-hand threads of the bolt. This nut is therefore formed with the internal threads $a$, adapted to engage the right-hand threads, as D, of the bolt. The nut A, although being in the main a right-hand nut, is provided with the internal threads $a'$, which are adapted to engage the left-hand bolt or left-hand threads formed externally upon the left-hand-threaded projection on the left-hand nut, which I shall presently refer to. The threads $a'$ have a greater diameter than the threads $a$. The length of the internally-threaded part $a'$ may be the same as or less than the length of the threaded part $a$. Thus it will be seen that the nut A, which I term the "right-hand nut," is provided with the internally-threaded part adapted to engage the right-hand-threaded bolt, and also with an internally-threaded part to engage a left-hand-threaded bolt, the two threaded parts being of unequal diameters.

B denotes the left-hand nut. It is shown in elevation in Fig. 6 and in section in Fig. 7. It is provided with the internal threads $b$, which are adapted to engage the left-hand screw-threads on the section E of the bolt C. The diameter of the threads $b$ may be equal to or less than the diameter of the internal threads $a$ within the right-hand nut A. Obviously, when a bolt like the bolt C is employed, having the right-hand-threaded section and the left-hand-threaded section of unequal diameters, it will be necessary that the threads $a$ and the threads $b$ shall likewise be of unequal diameters; but when the bolt with which the lock-nut is used is provided with its threaded sections of equal size and diameter and cut upon each other, then the threads $a$ and the threads $b$ may be of equal diameter. The left-hand nut B is provided with a tubular or cylindrical projection having left-hand screw-threads $b'$ cut thereon. This left-hand-threaded projection is adapted to engage the internal threads $a'$ within the nut A. After the right-hand nut has been placed upon the bolt, its internal threads $a$ engaging the right-hand threads thereof, the left-hand nut may then be screwed upon the bolt, its internal threads $b$ engaging the left-hand threads thereof, and when it is screwed up against the right-hand nut the left-hand-threaded projection $b'$ will engage the left-hand part $a'$ of the right-hand nut A, and thus the left-hand nut will be screwed into the right-hand nut and the two nuts may be screwed tightly together, as shown in Fig. 1, they at the same time engaging, respectively, the right and left threaded sections of the bolt, whereby is arranged and combined a strong and secure lock-nut.

The right-hand nut A is provided at each corner with a longitudinal perforation $c$, there being four of them. Of course there may be any number of these perforations, as may be desired. There may be less than four or more than four. Further, the left-hand nut is provided in one corner with an opening $d$, which is preferably made square. As the left-hand nut revolves upon the right-hand nut during the operation of screwing the former into the latter, the said opening or hole $d$ will register successively with the several perforations $c$ $c$, and when the left-hand nut has been screwed as tightly against the right-hand nut as it can be, taking care to leave the left-hand nut in such position that the hole $d$ therein may register with one of the perforations $c$, and of course regulating the tightness of the adjustment of the left-hand nut so as to permit two of the holes to be thus located, then a pin, as F, will be introduced through the two holes, which thus register for the purpose of connecting the right and left hand nuts, keeping them in proper relative position and preventing them from turning, said pin being preferably square for a certain part of its length so as to lie closely within the square hole $d$, while the rest portion of the pin is arranged to enter neatly into the perforation $c$.

Having thus described my invention, what I claim as new, and desire to secure by Letters Patent, is—

In a nut-lock, the combination, with a bolt formed with right and left hand screw-threads, of a nut A, having the internal threads $a$, adapted to engage the right-hand threads of the bolt, and the internal threads $a'$, adapted to engage the left-hand threads on the projection on the other nut, said threads $a$ and $a'$ being of unequal diameter and said nut having the perforation $c$, and the nut B, having the internal threads $b$, adapted to engage the left-hand threads of the bolt, and the external left-hand-threaded tubular projection $b'$, adapted to engage the threads $a'$ of the nut A, said nut B having the opening $d$, and the pin F, adapted to pass through the opening in the nut B and one of the perforations in the nut A, substantially as described.

In testimony whereof I affix my signature in presence of two witnesses.

ISAAC F. BISSELL.

Witnesses:
 HENRY T. COOK,
 T. L. WORTHINGTON.